(12) United States Patent
Purcell, Jr. et al.

(10) Patent No.: US 9,573,849 B2
(45) Date of Patent: Feb. 21, 2017

(54) BACKFILL, METHODS OF MAKING, AND USE THEREOF

(71) Applicant: Active Minerals International, Sparks, MD (US)

(72) Inventors: Robert J. Purcell, Jr., Baltimore, MD (US); Dennis C. Parker, Sparks, MD (US); Paul Fendley, Cockeysville, MD (US); Rudolph M. Coetzee, Paxton, MD (US); Steven B. Feldman, Cockeysville, MD (US)

(73) Assignee: ACTIVE MINERALS INTERNATIONAL, LLC, Sparks, MD (US)

( * ) Notice: Subject to any disclaimer, the term of this patent is extended or adjusted under 35 U.S.C. 154(b) by 260 days.

(21) Appl. No.: 14/266,627

(22) Filed: Apr. 30, 2014

(65) Prior Publication Data

US 2015/0239782 A1    Aug. 27, 2015

Related U.S. Application Data

(60) Provisional application No. 61/943,714, filed on Feb. 24, 2014.

(51) Int. Cl.
| | | |
|---|---|---|
| *C04B 18/12* | (2006.01) | |
| *C04B 14/00* | (2006.01) | |
| *C04B 28/04* | (2006.01) | |
| *E21B 43/12* | (2006.01) | |
| *C04B 28/02* | (2006.01) | |
| *C04B 111/00* | (2006.01) | |

(52) U.S. Cl.
CPC ............... *C04B 18/12* (2013.01); *C04B 14/00* (2013.01); *C04B 28/02* (2013.01); *C04B 28/04* (2013.01); *E21B 43/12* (2013.01); *C04B 2111/00724* (2013.01); *Y02W 30/93* (2015.05); *Y02W 30/94* (2015.05)

(58) Field of Classification Search
CPC .......... C04B 14/00; C04B 18/12; C04B 28/02; C04B 28/04; C04B 2111/00724; E21B 43/12; Y92N 30/93; Y92N 30/94
See application file for complete search history.

(56) References Cited

U.S. PATENT DOCUMENTS

2014/0119841 A1    5/2014    Purcell et al.

FOREIGN PATENT DOCUMENTS

| CN | 102515815 A | * | 6/2012 |
| CN | 102863256 A | * | 1/2013 |

OTHER PUBLICATIONS

Yao et al. "Development and Challenges on Mining Backfill Technology" Journal of Materials Science Research, 2012, vol. 1(4), pp. 73-78. p. 75, para 6.
Fedman et al. "Improving the Rheology and Workability of Concretes with Actl-Gel 208", Mar. 13, 2013; Retrieved from http://www.concretesdc.org/meetlngs/past_meet1ng&sesslons/session33/6.pdf p. 74, Table.
International Search Report for corresponding International PCT Application No. PCT/US15/17087, dated May 1, 2015.

* cited by examiner

*Primary Examiner* — Anthony J Green
(74) *Attorney, Agent, or Firm* — Hauptman Ham, LLP

(57) ABSTRACT

A composition in the form of a backfill is described. The composition comprises one or more mine tailings present in an amount greater than 50% by weight of the composition, one or more cementitious binder materials present in an amount ranging from 0% to 12% by weight of the composition, attapulgite present in an amount ranging from 0.01% to 4.00% by weight of the composition, and water. The fines content (Fc) of the one or more mine tailings is greater than or equal to 3%. Although subject to many uses, in some embodiments, the composition is suitable for managing tailings to be stored above ground or underground. For example, in some embodiments, the composition is suitable for filling mined out areas.

20 Claims, No Drawings

BACKFILL, METHODS OF MAKING, AND USE THEREOF

CROSS-REFERENCE

The present application claims priority benefit to U.S. Provisional Application No. 61/943,714, filed Feb. 28, 2014, the content of which is hereby incorporated by reference herein in its entirety.

FIELD

A composition, in the form of a backfill, comprising one or more mine tailings present in an amount greater than 25% of the composition, optionally one or more cementitious binder materials present in an amount ranging from 0% to 12% by weight of the composition, attapulgite present in an amount ranging from 0.01% to 1.00% by weight of the composition, and water. Although subject to many uses, in some embodiments, the composition is suitable for managing tailings to be stored above ground or underground. Although makeable by multiple methods, in some embodiments, the composition is made by mixing the component ingredients. In some embodiments, the composition is flowable through a conduit and/or has a decreased conduit abrasion, pumping time, or pumping energy requirement.

BACKGROUND

Each of the present inventors knows that storing mined minerals is performable by several methods. For example, sometimes tailings are storable in the form of a backfill designed to prevent solids from settling out when the backfill is stationary, e.g., in a tank, pit, or pipeline. Before storage, the backfill is sometimes transported over distances of up to 10 km, by flowing. If, for whatever reason, the flow stops or is substantially reduced or the pipe is nonlinear (e.g., forms an acute, right, or obtuse horizontal or vertical angle), the backfill sometimes appears as if it increases its static viscosity (at least locally), and in some instances, conditions resembling settling or setting up might be observed (at least locally).

Each of the present inventors also knows that flowing backfill needs energy; starting or re-starting the flow needs energy; and increasing the flow rate needs energy. Moreover, the flowability of the backfill varies with changes in the cemented paste backfill's water content and solid particle size distribution and the effects of flowing a backfill include abrasion of the flow pathway.

It is to be understood that both the foregoing general description and the following detailed description are representative and explanatory only and are not restrictive of the invention, as claimed.

DESCRIPTION OF THE EMBODIMENTS

A composition comprises one or more mine tailings present in an amount equal to or greater than 25% by weight of the composition; one or more cementitious binder materials present in an amount ranging from 0% to 12% by weight of the composition; attapulgite present in an amount ranging from 0.01% to 4.00% by weight of the composition; and water. The composition is in the form of a hydraulic backfill or a paste backfill.

In some embodiments, the hydraulic backfill or the paste backfill is in the form of a cemented backfill and referred to as a hydraulic cemented paste backfill or a cemented paste backfill.

In some embodiments, the attapulgite is present in an amount ranging from 0.02% to 0.7% by weight of the composition. In some embodiments, the attapulgite is present in an amount ranging from 0.03% to 0.15% by weight of the composition.

In some embodiments, the attapulgite is from a locality chosen from Palygorskaya, near the Popovka River, Perm, Russia; Attapulgus, Decatur Co., Georgia; at Tafraout, Morocco; and in the Hyderabad deposit, Andhra Pradesh, India. In some embodiments, the attapulgite is from Attapulgus, Decatur Co., Georgia. In some embodiments, the attapulgite is associated with other non-attapulgite minerals, such as montmorillonite, dolomite, calcite, talc, chlorite, quartz, and the like. In some embodiments, the attapulgite is substantially free of non-attapulgite minerals. Such purified attapulgite is, in some embodiments, available by using the methods in U.S. Pat. Nos. 6,444,601 and 6,130,179, each of which is incorporated herein in its entirety.

In some embodiments, the attapulgite is a purified attapulgite. In some embodiments, the purified attapulgite is chosen from Acti-Gel® 208 available from ACTIVE MINERALS INTERNATIONAL, LLC.

Mechanical and chemical processes are used to extract a desired product from a run of the mine ore and to produce a waste stream known as mine tailings. The mine tailings, in some embodiments, include ground rock and process effluents for mining the mined materials. In some embodiments, the mine tailings further include unrecovered or uneconomic metals, minerals, chemicals, organics, and process water.

In some embodiments, the one or more mine tailings are present in an amount greater than or equal to 65% by weight of the composition. In some embodiments, the one or more mine tailings are present in an amount ranging from 65% to 88% by weight of the composition. In some embodiments, the one or more mine tailings are present in an amount ranging from 75% to 85% by weight of the composition. In some embodiments, the one or more mine tailings are present in an amount ranging from 55% to 90% by weight of the composition. In some embodiments, the one or more mine tailings are present in an amount ranging from 75% to 85% by weight of the composition. In some embodiments, the one or more mine tailings are present in an amount ranging from 65% to 72% by weight of the composition. In some embodiments, the one or more mine tailings are present in an amount ranging from 70% to 88% by weight of the composition.

The one or more mine tailings have a fine component consisting of particles having a size less than 20 µm and a remaining component consisting of particles having a size greater than or equal to 20 µm. The fines content (Fc) of the one or more mine tailings is calculated by equation (1):

$$Fc = [Mf/(Mf+Mr)] \times 100\% \qquad (1)$$

In equation (1), Mf is the mass of the fine component, and Mr is the mass of the remaining component. (Mf+Mr) is the mass of the one or more mine tailings. The masses Mf and Mr are quantitatively determined by a combination of i) gravimetric analysis after mechanical shaking on nested sieves, including materials retained on a US Standard Sieve 200 mesh sieve (75µ), and ii) sedimentation techniques (e.g., hydrometer, laser analysis/light scattering, or x-ray absorption methods) for finer particles in suspension (ASTM D422, Standard Test Method for Particle-Size Analysis of Soils, ASTM International).

In some embodiments, the fines content (Fc) of the one or more mine tailings is greater than or equal to 3%. In some embodiments, the fines content (Fc) of the one or more mine tailings is greater than or equal to 8%. In some embodiments, the fines content (Fc) of the one or more mine tailings is less than or equal to 50%. In some embodiments, the fines content (Fc) of the one or more mine tailings is less than or equal to 20%. Any combination of these percentages are envisioned. For example, in some embodiments, the fines content (Fc) of the one or more mine tailings is greater than or equal to 8% and less than or equal to 20%, and, in some embodiments, the fines content (Fc) of the one or more mine tailings is greater than or equal to 3% and less than or equal to 50%.

In some embodiments, the one or more mine tailings have a particle size measurable using D85 ranging from 0.001 to 0.030 mm or 0.002 to 0.020 mm as quantitatively determined by ASTM D422 or equivalent methods. In some embodiments, the one or more mine tailings have a size measurable using D60 ranging from 0.001 to 0.030 mm or 0.002 to 0.020 mm. In some embodiments, the one or more mine tailings have a particle size measurable using D50 ranging from 0.001 to 0.030 mm or 0.002 to 0.020 mm. In some embodiments, the one or more mine tailings have a particle size measurable using D30 ranging from 0.001 to 0.030 mm or 0.002 to 0.020 mm. In some embodiments, the one or more mine tailings have a particle size measurable using D20 ranging from 0.001 to 0.030 mm or 0.002 to 0.020 mm. In some embodiments, the one or more mine tailings have a particle size measurable using D10 ranging from 0.001 to 0.030 mm or 0.002 to 0.020 mm.

In some embodiments, the mined materials are manmade, of natural origin, or mixtures thereof. In some embodiments, the mined materials are inorganics, organics, or mixtures thereof.

In some embodiments, the mined materials are chosen from rocks, mineral colloids, organic colloids, mineraloids, and minerals. Mixtures thereof are contemplated. In some embodiments, the mined materials are mined.

In some embodiments, the mined materials are chosen from polymers, metallic minerals, and fuels.

In some embodiments, the mined materials are rocks, and in some embodiments, the rocks are chosen from limestone and gravel.

In some embodiments, the mineral colloids and organic colloids are from soil. In some embodiments, colloids are chosen from crystalline silicate clays, noncrystalline silicate clays, iron and aluminium oxide clays (such as crystalline and noncrystalline varieties thereof), and organic colloid. In some embodiments, the organic colloid is humus.

In some embodiments, the mined materials are industrial minerals. In some embodiments, the industrial minerals are chosen from aggregates, alunite, asphalt (natural), barite, bauxites, bentonite, borates, brines, carbonates, clays, ball clays, corundum, diamond, diatomite, feldspar, nephelinesyenite, fluorspar, Fuller's earth, garnet, gem minerals, granite, graphite, gypsum, kaolin, kyanite, sillimanite, andalusite, limestone, dolomite, marble, mica, olivine, perlite, phosphate, potash, potassium minerals, pumice, quartz, salt, slate, silica sand, micro- or cryptocrystalline silica, soda ash, sodium bicarbonate, sodium sulfate, staurolite, sulfur, talc, vermiculite, wollastonite, and zeolites.

In some embodiments, the mined materials are chosen from limestone, clays, sand, gravel, diatomite, kaolin, bentonite, silica, barite, gypsum, and talc.

In some embodiments, the mined materials are chosen from coal, lignite, and peat.

In some embodiments, the mined materials are chosen from cement, slag, and silica fume.

In some embodiments, the mined materials are chosen from those comprising nickel, silver, diamond, and gold.

In some embodiments, the mined materials are mineraloids, and in some embodiments the mineraloids are chosen from obsidian, amber, ilmenite, opal, amber, jet, and limonite.

In some embodiments, the mined materials are chosen from minerals chosen from those in the silicate class, carbonate class, sulfate class, halide class, oxide class, sulfide class, phosphate class, element class, and organic class.

In some embodiments, the minerals are in the silicate class. In some embodiments, the silicates are in the form of rocks. In some embodiments, the silicates are chosen from feldspars, quartzes, olivines, pyroxenes, amphiboles, garnets, and micas.

In some embodiments, the minerals are in the carbonate class. In some embodiments, the carbonates are chosen from calcites, aragonites, dolomites, and siderites.

In some embodiments, the minerals are in the sulfate class. In some embodiments, the sulfates are chosen from anhydrites, celestines, barites, and gypsums. In some embodiments, related minerals are chosen from chromate, molybdate, selenate, sulfite, tellurate, and tungstate minerals.

In some embodiments, the minerals are in the halide class. In some embodiments, the halide minerals are natural salts, such as, fluorites, halites, sylvites, and sal ammoniac. In some embodiments, the halide class is chosen from fluoride, chloride, bromide, and iodide minerals.

In some embodiments, the minerals are in the oxide class. In some embodiments, the oxide minerals are chosen from hematites, magnetites, chromites, spinels, ilmenites, and rutiles. In some embodiments, the oxide minerals are chosen from oxide and hydroxide minerals.

In some embodiments, the minerals are in the sulfide class. In some embodiments, the sulfide minerals are chosen from pyrite, chalcopyrite, pentlandite, and galena. In some embodiments, the sulfide minerals are chosen from selenides, tellurides, arsenides, antimonides, bismuthinides, and sulfosalts.

In some embodiments, the minerals are in the phosphate class. In some embodiments, the phosphate minerals are chosen from any mineral having a tetrahedral unit $AO_4$, in which A is chosen from phosphorus, antimony, arsenic or vanadium. In some embodiments, the phosphate mineral is apatite. In some embodiments, the phosphate minerals are chosen from arsenate, vanadate, and antimonate minerals.

In some embodiments, the minerals are in the elemental class. In some embodiments, the elemental minerals are chosen from gold, silver, copper, antimony, bismuth, graphite, sulfur, molybdenum, and Platinum Group Minerals (PGM). In some embodiments, the elemental minerals are natural alloys, such as, electrum, phosphides, silicides, nitrides, and carbides.

In some embodiments, the minerals are in the organic class. In some embodiments, the organic minerals are chosen from oxalates, mellitates, citrates, cyanates, acetates, formates, and hydrocarbons. In some embodiments, the organic minerals are chosen from whewellite, moolooite, mellite, fichtelite, carpathite, evenkite, and abelsonite.

A process effluent typically contains a deleterious substance. In some embodiments, the process effluent is chosen from hydrometallurgical facility effluents, milling facility effluents, and mine water effluents.

In some embodiments, the hydrometallurgical facility effluent is chosen from an effluent from the acidic leaching, a solution concentration and recovery of metals by aqueous chemical methods, tailings slurries, and the like.

In some embodiments, the milling facility effluent is chosen from tailing slurries, a heap leaching effluents, a solution mining effluent and the like.

In some embodiments, the mine water effluent is chosen from, in the context of mining activities, water that is pumped from or flows out of any underground works, solution chambers or open pits.

In some embodiments, two or more mine tailings are blended. For example, to reduce water demand or alter the rheology of a starting one or more mine tailings, the starting one or more mine tailings is blended with a coarse component. In some embodiments, the coarse component is a different one or more mine tailings than the starting one or more mine tailings. In some embodiments, the different one or more mine tailings is chosen from any one or more mine tailings noted herein. For example, the coarse component is chosen from sand or crushed rock.

In some embodiments, the coarse component has a particle size measurable using D50 ranging from 1.0 to 25.0 mm or 4.0 to 17.0 mm as quantitatively determined by ASTM D422 or equivalent methods. In some embodiments, the coarse component has a particle size measurable using D50 ranging from 7.0 to 14.0 mm or 10.0 to 13.0 mm.

In some embodiments, the coarse component (optionally having the D50 values noted herein) and the starting one or more mine tailings (optionally having the Fc values noted herein) are blended by mixing. The coarse component content (Cc) of the blend of both the coarse component and the starting one or more mine tailings is calculated by equation (2):

$$Cc=[Mc/(Mc+Ms)]\times 100\% \quad (2)$$

In equation (2), Mc is the mass of the coarse component, and Ms is the mass of the starting one or more mine tailings. (Mc+Ms) is the mass of the blend of both the coarse component and the starting one or more mine tailings. The masses Mf and Mr are quantitatively determined by a combination of i) gravimetric analysis after mechanical shaking on nested sieves, including materials retained on a US Standard Sieve 200 mesh sieve (75μ), and ii) sedimentation techniques (e.g., hydrometer, laser analysis/light scattering, or x-ray absorption methods) for finer particles in suspension (ASTM D422, Standard Test Method for Particle-Size Analysis of Soils, ASTM International).

In some embodiments, the coarse component content (Cc) is greater than or equal to 3%. In some embodiments, the coarse component content (Cc) is greater than or equal to 5%. In some embodiments, the coarse component content (Cc) is less than or equal to 50%. In some embodiments, the coarse component content (Cc) is less than or equal to 25%. Any combination of these percentages are envisioned. For example, in some embodiments, the coarse component content (Cc) is greater than or equal to 3% and less than or equal to 50%, and, in some embodiments, the coarse component content (Cc) is greater than or equal to 0% and less than or equal to 5%.

In some embodiments, the blend of the coarse component and the starting one or more mine tailings has the fines content (Fc) greater than or equal to 3%. In some embodiments, the fines content (Fc) of the blend is greater than or equal to 8%. In some embodiments, the fines content (Fc) of the blend is less than or equal to 50%. In some embodiments, the fines content (Fc) of the blend is less than or equal to 20%. Any combination of these percentages are envisioned. For example, in some embodiments, the fines content (Fc) of the blend is greater than or equal to 8% and less than or equal to 20%, and, in some embodiments, the fines content (Fc) of the blend is greater than or equal to 3% and less than or equal to 50%.

In some embodiments, the one or more cementitious binder materials are present in an amount ranging from 2% to 12% by weight of the composition. In some embodiments, the amount ranges from 3% to 6% or from 4% to 5% by weight of the composition. In some embodiments, the amount ranges from greater than 0% to less than or equal to 1%. In some embodiments, the amount is 0% by weight of the composition.

In some embodiments, the cementitious binder materials are chosen from those manufactured materials, such as lime and Portland cement. In some embodiments, cementitious binder materials are chosen from those processed by-products of manufacturing and power generation.

In some embodiments, the one or more cementitious binder materials are chosen from Portland cements such as ASTM C150 Type I, or CSA A3001-03 Type GU.

In some embodiments, the one or more cementitious binder materials are chosen from lime. In some embodiments, the lime is chosen from calcined limestones, quicklime, and hydrated lime.

In some embodiments, the one or more cementitious binder materials further comprise one or more supplementary cementing materials.

In some embodiments, the one or more supplementary cementitious binder materials are chosen from ground granulated blast furnace slag (slag), fly ash (FA), natural and/or manufactured pozzolans, such as metakaolins.

In some embodiments, the one or more supplementary cementitious binder materials are chosen from granulated ground blast furnace slag (GGBFS), such as a pozzolanic by-product of iron manufacturing. In some embodiments, GGBFS includes coarse, rough textured particles which are composed of approximately 93-99% by weight of glass.

In some embodiments, the one or more supplementary cementitious binder materials are chosen from fly ash. In some embodiments, the fly ash is a very fine grained pozzolanic material (silica & alumina oxides) and in the presence of both an activator and water will produce cementitious compounds (similar to those produced from the pozzolanic reaction of slag).

In some embodiments, the one or more cementitious binder materials further comprise one or more waste materials.

In some embodiments, the one or more waste materials are chosen from cement kiln dust (CKD), finely ground industrial waste glass and municipal waste glass.

In some embodiments, the one or more cementitious binder materials comprise one or more Portland cements, one or more supplementary cementitious materials, and one or more waste materials. In some embodiments, the one or more cementitious binder materials comprise one or more Portland cements and one or more supplementary cementitious binder materials.

In some embodiments, the one or more cementitious binder materials further comprises silica fume.

Water is obtainable from many sources. In some embodiments, the water is from sources of fresh water or sources of saline water. In some embodiments, the water is brackish or brine. In some embodiments, the water is from a source chosen from brine ponds, sea water, ocean water, lakes, ponds, and ground water.

In some embodiments, the water has a pH ranging from 2 to 13. In some embodiments, the pH ranges from 2 to 7 or from 4.5 to 9.5 or from 5.0 to 7.8 or from 7 to 13. In some embodiments, the pH is adjusted using a neutralizer.

In some embodiments, the neutralizer is selected from gypsum, hydrated lime, ammonium nitrate, and aluminum sulfate. In some embodiments, the neutralizer is chosen from sodium hydroxide, caustic soda, hydrated lime, shell meal, limestone, burned lime, dolomite, sugar beet lime, and calcium silicate. In some embodiments, the neutralizer is chosen from aluminum sulfate, calcium chloride, lime sulfur, ferric sulfate, sulfuric acid, sulfur, and gypsum. In some embodiments, the neutralizer is selected from gypsum, hydrated lime, ammonium nitrate, and aluminum sulfate.

In some embodiments, at least one other solid or liquid substance is present in the aqueous liquid. In some embodiments, the at least one other solid or liquid substance is miscible in a component of the water. In some embodiments, the at least one other solid or liquid substance is immiscible in a component of the water. In some embodiments, the at least one other solid or liquid substance is in the source of water or is added in a process of gathering the mined materials.

In some embodiments, the water comprises one or more solvated salts. In some embodiments, the one or more solvated salts are chosen from chloride salts and sulphate salts.

In some embodiments, the water is present in an amount greater than or equal to 4.99% and less than or equal to 49.99% by weight of the composition. In some embodiments, the water is present in an amount greater than or equal to 4.99% and less than or equal to 34.99% by weight of the composition. In some embodiments, the amount ranges from 22 to 41% or from 28 to 35% by weight of the composition. In some embodiments, the amount ranges from 12 to 25% or from 15 to 20% by weight of the composition. In some embodiments, the water is present in an amount greater than or equal to 4.99% and less than or equal to 49.99%

In some embodiments, the composition further comprises at least one mineral suspension agent.

In some embodiments, the at least one mineral suspending agent is present in an amount sufficient to disperse the solid particulates. In some embodiments, the effective amount of the at least one mineral suspending agent ranges from 0.01% to 5.0% by weight relative to the total dry weight of the at least one mineral suspending agent and the solid particulates. In some embodiments, the effective amount ranges from 0.1% to 4.5% or from 0.4% to 3.0% or from 1% to 2%.

In some embodiments, the at least one mineral suspending agent is chosen from a clay. In some embodiments, the clay is chosen from palygorskite, bentonite, montmorillonite, and sepiolite. In some embodiments, the at least one mineral suspending agent is palygorskite. In some embodiments, the palygorskite is from Attapulgus, Ga.

In some embodiments, the at least one mineral suspending agent is bentonite. In some embodiments, the bentonite is from a locality chosen from near Rock River, Wyo. and Mississippi. In some embodiments, the bentonite is chosen from calcium bentonite and sodium benonite. In some embodiments, the bentonite is substantially free of non-bentonite minerals. In some embodiments, the at least one mineral suspending agent is montmorillonite. In some embodiments, the montmorillonite is from a locality chosen from Montmorillon, Vienne, France; at Belle Fourche, Butte Co., South Dakota; and at Clay Spur, near Newcastle, Crook Co., and at Strasburg, Shenandoah Co., Virginia. In some embodiments, the montmorillonite is associated with other non-montmorillonite minerals, such as cristobalite, zeolites, biotite, quartz, orthoclase, dolomite, and the like. In some embodiments, the montmorillonite is substantially free of non-montmorillonite minerals. In some embodiments, the at least one mineral suspending agent is sepiolite. In some embodiments, the sepiolite is from a locality chosen from in Little Cottonwood Canyon, Salt Lake Co., Utah; from Crestmore, Riverside Co., California; at Ash Meadows, Nye Co., Nevada; and Cerro Mercado, Durango, Mexico. In some embodiments, the sepiolite is associated with other non-sepiolite minerals, such as dolomite. In some embodiments, the sepiolite is substantially free of non-sepiolite minerals.

In some embodiments, the aqueous suspension comprises a clay dispersant. In some embodiments, the clay dispersant is chosen from substances that, in an aqueous environment, absorb on the at least one mineral suspending agent and have the ability to disaggregate the at least one mineral suspending agent or to stabilize a suspension of the at least one mineral suspending agent. In some embodiments, the clay dispersant is chosen from condensed phosphates, polyacrylates, organic phosphonates, polysulfonates, sulfonated polycondensates, polymaleates, and polymers derived from natural products. In some embodiments, the clay dispersant is chosen from poly-anionic, poly-cationic, poly non-ionic, and poly-amphoteric dispersants that function as clay dispersants.

In some embodiments, the clay dispersant is chosen from tetrasodium pyrophosphate, sodium tripolyphosphate, condensed phosphate dispersants, and sodium salts thereof. In some embodiments, the clay dispersant is chosen from silicates, quaternary amines, petroleum, sulfonates, soda ash, and lime. In some embodiments, the silicates are chosen from sodium silicates and potassium silicates. In some embodiments, the lime is chosen from lime carbonates.

In some embodiments, the composition has a slump ranging from 140 mm to 260 mm. In some embodiment, the slump ranges from 150 mm to 250 mm.

In some embodiments, the composition has a yield stress less than 800 Pa or 400 Pa. In some embodiments, the yield stress is less than 100 Pa. In some embodiments, the yield stress ranges from 100 to 700 Pa.

In some embodiments, the composition has a 7-day shear stiffness Unconfined Compressive Strength (UCS) ranging from 100 kPa to 2 MPa for binder contents of 3% and 7%, respectively, and 28-day UCS ranging from 250 kPa to 10 MPa for binder contents of 3% to 7%, respectively. In some embodiments, the shear stiffness uniaxial compressive strength ranges from 15 kPa to 4.5 MPa. In some embodiments, the shear stiffness uniaxial compressive strength ranges from 25 kPa to 10 MPa or from 50 kPa to 7 kPa. In some embodiments, the UCS is measured days after the composition is made. In some embodiments, the UCS is measured 1, 3, 7, 21, 28, or 56 days after the composition is made.

The composition is makeable by several methods. In some embodiments, the composition is made by mixing one or more mine tailings, one or more cementitious materials; attapulgite; and water to form a resultant composition. The concentrations of the ingredients are adjusted accordingly in any amount noted above for the ingredient. For example, the one or more mine tailings is present in an amount greater than 65% by weight of the resultant composition; the one or more cementitious binder materials is present in an amount ranging from 1% to 8% by weight of the resultant composition; and the attapulgite is present in an amount ranging from 0.01% to 4.00% by weight of the resultant composition. The resultant composition is in the form of a cemented paste backfill.

In some embodiments, one or more of the other ingredients noted above are mixed to make the composition. The concentrations of the other ingredients are adjusted accordingly in any amount noted above for the ingredient. For example, in some embodiments, the one or more cementitious binder materials comprise one or more supplementary cementing materials. In some embodiments, the composition further comprises at least one mineral suspension agent present in an amount ranging from 0.05% to 5.0% by weight relative to the total dry weight of the at least one mineral suspending agent and the solid particulates.

In some embodiments, the composition comprises one or more mine tailings present in an amount equal to or greater than 50% by weight of the composition; attapulgite present in an amount ranging from 0.01% to 1.00% by weight of the composition; and water present in an amount greater than 4.99% by weight of the composition. The fines content (Fc) of the one or more mine tailings is greater than or equal to 3%. In some embodiments, the composition is in the form of a hydraulic backfill. In some embodiments, one or more mine tailings present in an amount equal to or greater than 55% by weight of the composition. In some embodiments, one or more mine tailings present in an amount ranging from 75 to 85% by weight of the composition. In some embodiments, the composition further comprises one or more cementitious binder materials present in an amount ranging from greater than 0% and less than or equal to 1% by weight of the composition. In some embodiments, the water is present in an amount ranging from 4.99% to 49.99% by weight of the composition. In some embodiments, the water is present in an amount ranging from 22 to 41% or from 28 to 35% by weight of the composition. In some embodiments, the composition is further blended with a coarse component (coarse component content (Cc) ranging from greater than 0 to less than or equal to 5%) of crushed waste rock. In some embodiments, the crushed waste rock has a D50 ranging from 1.0 to 21.0 mm or from 7.0 to 14.0 mm.

In some embodiments, the composition comprises one or more mine tailings present in an amount equal to or greater than 50% by weight of the composition; one or more cementitious binder materials present in an amount ranging from 1% to 12% by weight of the composition; attapulgite present in an amount ranging from 0.01% to 1.00% by weight of the composition; and water present in an amount greater than 4.99% by weight of the composition. The fines content (Fc) of the one or more mine tailings ranges from 8% to 20%. In some embodiments, the composition is in the form of a cemented hydraulic backfill. In some embodiments, one or more mine tailings present in an amount equal to or greater than 55% by weight of the composition. In some embodiments, one or more mine tailings present in an amount ranging from 75 to 85% by weight of the composition. In some embodiments, the water is present in an amount ranging from 4.99% to 49.99% by weight of the composition. In some embodiments, the water is present in an amount ranging from 22 to 41% or from 28 to 35% by weight of the composition. In some embodiments, the composition is further blended with a coarse component (coarse component content (Cc) ranging from greater than 0 to less than or equal to 5%) of crushed waste rock. In some embodiments, the crushed waste rock has a D50 ranging from 1.0 to 21.0 mm or from 7.0 to 14.0 mm.

In some embodiments, the composition comprises one or more mine tailings present in an amount equal to or greater than 65% by weight of the composition; and attapulgite present in an amount ranging from 0.01% to 1.00% by weight of the composition; and water present in an amount greater than 4.99% by weight of the composition. The fines content (Fc) of the one or more mine tailings is greater than or equal to 3%. In some embodiments, the composition is in the form of a paste backfill. In some embodiments, one or more mine tailings present in an amount equal to or greater than 55% by weight of the composition. In some embodiments, one or more mine tailings present in an amount ranging from 65 to 72% by weight of the composition. In some embodiments, the composition further comprises one or more cementitious binder materials present in an amount ranging from greater than 0% to less than or equal to 1% by weight of the composition. In some embodiments, the water is present in an amount ranging from 4.99% to 34.99% by weight of the composition. In some embodiments, the water is present in an amount ranging from 12 to 25% or from 15 to 20% by weight of the composition. In some embodiments, the composition is further blended with a coarse component (coarse component content (Cc) ranging from greater than 0 to less than or equal to 5%) of crushed waste rock. In some embodiments, the crushed waste rock has a D50 ranging from 1.0 to 21.0 mm or from 7.0 to 14.0 mm.

In some embodiments, the composition comprises one or more mine tailings present in an amount equal to or greater than 65% by weight of the composition; one or more cementitious binder materials present in an amount ranging from 1% to 12% by weight of the composition; attapulgite present in an amount ranging from 0.01% to 1.00% by weight of the composition; and water present in an amount greater than 4.99% by weight of the composition. The fines content (Fc) of the one or more mine tailings ranges from 8% to 20%. In some embodiments the composition is in the form of a cemented paste backfill. In some embodiments, one or more mine tailings is present in an amount equal to or greater than 55% by weight of the composition. In some embodiments, one or more mine tailings is present in an amount ranging from 65 to 72% by weight of the composition. In some embodiments, the composition is further blended with a coarse component (coarse component content (Cc) ranging from greater than 0 to less than or equal to 5%) of crushed waste rock. In some embodiments, the crushed waste rock has a D50 ranging from 1.0 to 21.0 mm or from 7.0 to 14.0 mm.

In some embodiments, the composition is made by a process further comprising adding one or more thickeners to the one or more mine tailings.

In some embodiments, the making comprises agitation. In some embodiments, the agitation is mechanical. In some embodiments, the agitation is chosen from stifling, pumping, and milling. In some embodiments, the solid particulates are present in an amount sufficient to create shear forces on the aqueous liquid and to facilitate homogenization of the aqueous suspension. In some embodiments, agitation is the result of concrete drilling, ultrasound dispersing, or cavitation.

In some embodiments, the composition is made by a process in which the mixing occurs in a mine tailings storage facility.

The composition is useable by several methods. In some embodiments, the composition is solidified in the mine tailings storage facility. For example, the composition is allowed to stand for a period of time sufficient for solidification. In some embodiments, the mine tailing storage facility is underground. In some embodiments, the mine tailings storage facility is aboveground. In some embodiments, the mine tailings storage facility is a tank, pit, piping, or other container suitable for storing mine tailings. In some embodiments, the composition is used to fill in a mined-out area.

In some embodiments, the method further comprises transporting the composition to a mine tailings storage facility. In some embodiments, the transporting is chosen from gravity delivery to borehole or decline leading to the mine tailings storage facility; conveyor to borehole or decline leading to the mine tailings storage facility; pump delivery thru a borehole or decline leading to the mine tailings storage facility; vehicle delivery to a borehole or decline leading to the mine tailings storage facility; and pipeline delivery to a borehole or decline leading to the mine tailings storage facility.

In some embodiments, the composition is transported a distance greater than or equal to 200 m.

In some embodiments, the composition is in a form that makes it possible to be transported long distances. In some embodiments, transporting is facilitated by the addition of an effective amount of pumping or shear force.

In some embodiments, the composition is transported a distance greater than or equal to 200 m. In some embodiments, the distance is greater than or equal to 0.100 km or 10 km. In some embodiments, transportation comprises flowing the composition in a conduit. In some embodiments, the conduit comprises a pipeline, weirs, u-shaped structures, moving conveyers, and other structures to convey water over distances greater than 200 m. In some embodiments, the pipes in the pipeline have in inner diameter of at least 1.28 cm or 5 cm or 300 cm. In some embodiments the pipes have an inner diameter ranging from 1.28 cm to 200 cm or from 5 cm to 100 cm or from 10 cm to 75 cm. In some embodiments, the conduits, pipelines, u-shaped structures, weirs, moving conveyers and other structures to convey water over distances greater than 200 m have a transverse dimension of at least 1.28 cm or 5 cm or 100 cm. In some embodiments, the conduits, pipelines, u-shaped structures, weirs, moving conveyers and other structures to convey water over distances greater than 200 m have a transverse dimension ranging from 1.28 cm to 30 cm.

In some embodiments, during transporting by flowing the composition, the flowing has a Reynolds number below 4,000. In some embodiments, the Reynolds number is below 2,000. In some embodiments, the Reynolds number ranges from 2,000 to 3,000 or from 500 to 1,750.

In some embodiments, during transporting by flowing, the flowing changes in rate by at least 10% or 25% or 50%.

In some embodiments, transporting comprises pumping the composition. In some embodiments, transporting is further facilitated by gravity and the placement of the conduit. In some embodiments, transporting is facilitated by shear force.

EXAMPLE 1

Following a run of an iron ore mine, tailings are produced. The tailings have a particle size D85 of 25 μm. The tailings, Portland cement (ASTM C150 Type I), and purified attapugite made from the methods in U.S. Pat. Nos. 6,444,601 and 6,130,179 are mixed in the following amounts, respectively, 70.1%, 5.5%, and 0.035% (weight percent) with water.

The composition is flowable in a pipeline.

EXAMPLE 2

The following compositions were prepared.
AG=(Acti-Gel® 208, available from Active Mineral International)

| Composition No. | OPC Content (kg) | AGG (kg) | Tailings (kg) * | Water (kg) | AG (kg) | Slump (inches) | Slump after AG (inches) | Tailings solids level (%) |
|---|---|---|---|---|---|---|---|---|
| 1.1: Std | 5.33 | 38.34 | 38.34 | None | — | 8.75 | — | 74.3 |
| 1.2: 0.05% AG | 5.33 | 38.34 | 38.34 | 0.5 | 0.048 | 8.75 | 8.00 | 74.3 |
| 1.3: 0.03% AG | 5.33 | 38.34 | 38.34 | 0.5 | 0.029 | 8.75 | 8.25 | 74.3 |

AG = (Acti-Gel ® 208, available from Active Mineral International)
* Dry weight basis (52.48 kg wet basis as received).

AGG=Aggregates such as crushed waste rock from the mine having a D50 of up 125 mm. Compositions 1.1, 1.2, and 1.3 were prepared in batches using standard recipes of backfill to a predetermined slump (between 8 and 9"). Example 1.1 is the standard (Std). The Ordinary Portland Cement (OPC, 6.5% cement).

Other compositions were prepared. The Tailings and Aggregate (AGG) were mixed with 2%, 2.5%, 4.5%, 5.5% and 6.5% OPC weight percentages.

Each of the compositions were added to 36 separate cast 2 cylinders (4×8"). The Unconfined Compression Strength (UCS) on day 3, 5, 7, 14, 21 and 28 were measured for each composition using the protocol of ASTM C39-C39M-12A or equivalent. As an example, at day 3, the following data were obtained.

| Composition No. | UCS (MPa) Run 1 | UCS (MPa) Run 2 | UCS (MPa) Average | % change v. Std |
|---|---|---|---|---|
| 1.1: Std | 0.56 | 0.52 | 0.54 | n/a |
| 1.2: 0.05% AG | 0.57 | 0.57 | 0.57 | 5.1% |
| 1.3: 0.03% AG | 0.63 | 0.66 | 0.64 | 18.9% |

Example 1.3, having 0.03% Acti-Gel® 208 dose increased the 3-day compressive strengths by 19%. This result promises an appreciable reduction in cement and/or earlier return to mining operations and improved safety.

EXAMPLE 3

The visual mix properties and flowability were observed for compositions 1.1 to 1.3 using the following procedure. A pipe having a vertical section of about 12 feet over a horizontal section of about 8 feet was filled with water. The vertical and horizontal section of pipes are connected by a right angle elbow joint. The end of the horizontal section of pipe has a valve followed by a short section of pipe (about 8 inches) and a second right angle elbow joint. A rubber ball was added at the top portion to form a barrier between water and paste. A known amount of paste was added to a hopper atop the vertical section of the pipe. A valve near the end of the horizontal section was opened to allow water and paste to drain. After the ball exited from the pipe, a bucket was introduced to collect in the bucket about 13 liters of paste. The time between the start of collection and the time sufficient for filling the bucket to 13 liters of paste was recorded. The flow of paste was observed.

The following results were obtained.

| Composition | Slump (inches) | Paste Weight collected in bucket | Time (s) | Flow rate (kg/s) |
|---|---|---|---|---|
| 1.1: Std | 8.60 | 7 | 19.2 | 0.36 |
| 1.2: 0.05% AG | 8.6/8.8 | 28.45 | 62.0 | 0.46 |
| 1.3: 0.03% AG | 8.4/9.25 | 13.3 | 19 | 0.70 |

AG=(Acti-Gel® 208, available from Active Mineral International).

For the run using composition 1.1, the pipe blocked and did not fill bucket to 13 liter mark. One slug of paste moved through until the pipe was blocked. This accounts for the 19 second run. A technician had to disassemble pipe to clean out the blockage.

For the run using composition 1.2, the paste flow was unobstructed and the contents emptied the hopper out to a yield of approximately 80%. The pipes were easy to washout for the next run.

For the run using composition 1.3, the bucket was filled for only the first 19 s to better compare with "std" composition 1.1. Afterward, the pipe's content continued to empty out to ~82% yield. The pipes were easy to washout for the next run.

These data show that composition 1.3 resulted in a near doubling (94%) in the flow rate coming out of a fixed flow pipe apparatus with multiple angles. E.g., increased flowability and probably prevents pipe blockages.

EXAMPLE 4

Following a run of a diamond mine, tailings are produced. The tailings have a particle size D85 of 38 μm. The tailings, Portland cement (ASTM C150 Type I), and attapugite from Attapulgus, Decatur Co., Georgia are mixed in the following amounts, respectively, 78.3%, 5.1%, and 0.04% (weight percent) with water. Sepiolite in an amount of 0.01% of the solids weight percentage is thereafter mixed.

The resultant composition is pumped 2 km to a pit, where the composition is allowed to stand and thereafter solidify.

EXAMPLE 5

A sulfide mine run produces mine tailings including cement kiln dust. Water, a Portland cement, lime, and fly are mixed. Thereafter, to the resultant composition is mixed Acti-Gel® 208, available from Active Mineral International. The resultant composition is added to the mine tailings including cemented kiln dust.

Other embodiments of the invention will be apparent to those of ordinary skill in the art from consideration of the specification and practice of the embodiments disclosed herein. It is intended that the specification and examples be considered as nonlimiting, with a true scope and spirit of the invention being indicated by the following claims.

What is claimed is:

1. A composition, comprising:
   one or more mine tailings present in an amount greater than 25% by weight of the composition;
   one or more cementitious binder materials present in an amount ranging from 0% to 12% by weight of the composition;
   purified attapulgite substantially free of non-attapulgite minerals present in an amount ranging from 0.01% to 0.7% by weight of the composition; and
   water;
   wherein the fines content (Fc) of the one or more mine tailings is greater than or equal to 3%.

2. The composition of claim 1, wherein the purified attapulgite substantially free of non-attapulgite minerals is present in an amount ranging from 0.02% to 0.15% by weight of the composition.

3. The composition of claim 1, wherein the purified attapulgite substantially free of non-attapulgite minerals is present in an amount ranging from 0.03% to 0.15% by weight of the composition.

4. The composition of claim 1, wherein the fines content (Fc) of the one or more mine tailings ranges from 3% to 20%.

5. The composition of claim 4, wherein the one or more cementitious binder materials are present in an amount ranging from greater than 0% to less than 1% by weight of the composition.

6. The composition of claim 4, wherein the one or more cementitious binder materials are present in an amount ranging from 1% to 12% by weight of the composition.

7. The composition of claim 1, wherein the one or more cementitious binder materials are present in an amount ranging from greater than 0% to less than 1% by weight of the composition.

8. The composition of claim 1, wherein the one or more cementitious binder materials are present in an amount ranging from 1% to 12% by weight of the composition.

9. The composition of claim 1, wherein the one or more mine tailings are present in an amount ranging from 65% to 88%.

10. The composition of claim 1, wherein the one or more cementitious binder materials are chosen from Portland cements and lime.

11. The composition of claim 1, wherein the one or more cementitious binder materials further comprise one or more supplementary cementitious materials.

12. The composition of claim 1, further comprising at least one mineral suspension agent chosen from bentonite, montmorillonite, and sepiolite.

13. The composition of claim 1, wherein the composition has a slump ranging from 140 mm to 260 mm.

14. The composition of claim 1, wherein the composition has a ranging from 250 kPa to 5 MPa.

15. The composition of claim 1, wherein the purified attapulgite substantially free of non-attapulgite minerals is present in an amount ranging from 0.01% to 0.15% by weight of the composition.

16. A method of making a composition, comprising mixing (a) one or more mine tailings;
   (b) one or more cementitious materials;
   (c) purified attapulgite substantially free of non-attapulgite minerals; and
   (d) water to form a resultant composition;
   wherein the (a) one or more mine tailings is present in an amount greater than 50% by weight of the composition;

wherein the (b) one or more cementitious binder materials is present in an amount ranging from 0% to 12% by weight of the composition;

wherein the (c) purified attapulgite substantially free of non-attapulgite minerals is present in an amount ranging from 0.01% to 0.7% by weight of the composition; and wherein the fines content (Fc) of the one or more mine tailings is greater than or equal to 3%.

17. The method of claim 16, wherein the resultant composition is solidified in a mine tailings storage facility.

18. The method of claim 16, further comprising mixing a coarse component with the resultant composition to form a blend, wherein the coarse component content (Cc) is greater than or equal to 0% and less than or equal to 5%.

19. A method, comprising mixing (a) one or more mine tailings;

(b) one or more cementitious materials;

(c) purified attapulgite substantially free of non-attapulgite minerals; and (d) water to form a resultant composition;

wherein the (a) one or more mine tailings is present in an amount greater than 50% by weight of the composition;

wherein the (b) one or more cementitious binder materials is present in an amount ranging from 0% to 12% by weight of the composition;

wherein the (c) purified attapulgite substantially free of non-attapulgite minerals is present in an amount ranging from 0.01% to 0.7% by weight of the composition; and wherein the fines content (Fc) of the one or more mine tailings is greater than or equal to 3%; and thereafter transporting the resultant composition via a conduit to a mine tailings storage facility; and thereafter waiting a period of time sufficient for the resultant transported composition to solidify in the mine tailings storage facility.

20. The method of claim 19, wherein the transporting is chosen from gravity delivery to borehole or decline leading to the mine tailings storage facility; conveyor delivery to a borehole or a decline leading to the mine tailings storage facility; a pump delivery thru a borehole or decline leading to the mine tailings storage facility; vehicle delivery to a borehole or decline leading to the mine tailings storage facility; and pipeline delivery to a borehole or decline leading to the mine tailings storage facility.

* * * * *